3,559,012
STEP MOTION PRODUCING APPARATUS
Barrier Andrew Gillies, Crowthorne, and Adrian John Bolton, Bengeo, England, assignors to International Computers Limited, London, England, a British company
Filed Oct. 15, 1968, Ser. No. 767,686
Claims priority, application Great Britain, Oct. 19, 1967, 47,551/67
Int. Cl. H02k 37/00
U.S. Cl. 318—138                                     5 Claims

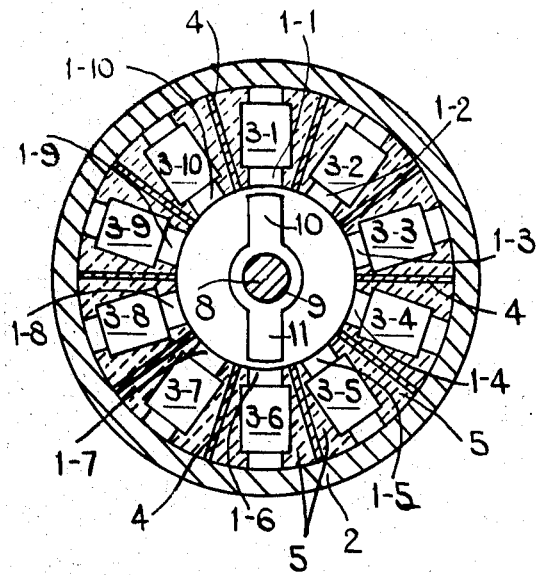
FIG.1.
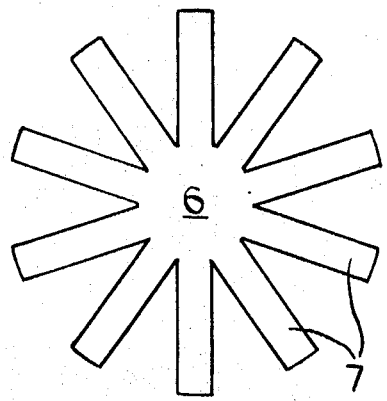
FIG.2.
FIG.3.
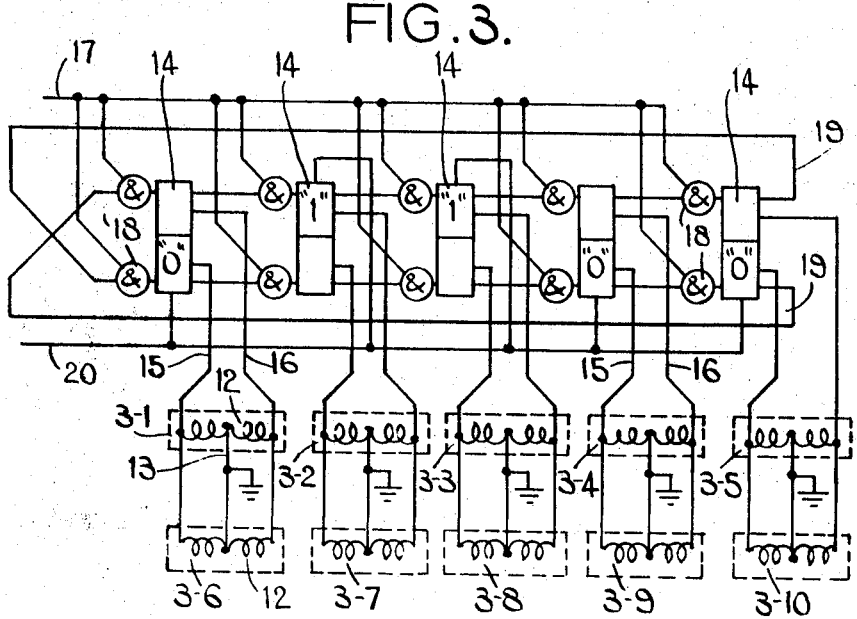
INVENTORS
BARRIER ANDREW GILLIES
ADRIAN JOHN BOLTON
BY Hane and Bayley
ATTORNEYS ём
United States Patent Office 3,559,012
Patented Jan. 26, 1971

ABSTRACT OF THE DISCLOSURE

A stepping motor has an even number of stator poles and a two pole rotor. A shift register energizes stator pole windings, each stage of the register being connected to a pair of diametrically opposed stator pole coils. The register is pre-set to produce a stator magnetic field pattern and upon receipt of shift signals, the pattern is stepped around the stator. The stator field pattern is such that the rotor is attracted to a particular pole while poles adjacent to the particular pole and on either side thereof produce repulsive fields aiding in retaining the rotor in alignment with the particular pole. A shift signal steps the stator field pattern such that the adjacent pole in the direction of rotation produces an attractive field tending to align the rotor therewith while the particular pole and other adjacent pole produce repulsive forces also tending to step the rotor by increasing the torque applied to the rotor. The stator is produced by building a stack of star-shaped laminations, assembling the stack with coils on each leg into a cylindrical case, setting the whole in potting compound and boring out the centre of the laminations to leave independent poles.

BACKGROUND OF THE INVENTION

The present invention relates to motion producing apparatus and, in particular to stepwise driven electrical motors. The motor includes an even number of stator poles and a two-pole rotor of a permanently magnetised material. As is common in stepping motors, a stator field is developed in coils, each coil correspondnig to individual stator poles.

It has previously been proposed, for example, in connection with stepwise driven electric motors, to provide a stator having a number of magnetisable poles in conjunction with a rotor having a predetermined magnetic state. The rotor is caused to move from pole to pole in accordance with an attractive magnetic field produced at each of the poles in turn. Heretofore, in stepwise driven electric motors in which only an attractive magnetic field is produced, the torque available to move the motor has been severely limited. Moreover, in a number of prior proposals the pattern of polar magnetisation has involved alternate stator poles being magnetised to the same magnetic state with the result that the direction of movement of the rotor in starting from rest is, in the absence of some additional external force, indeterminate.

It has also been proposed to digitally actuate stepwise driven electric motors by applying digital signals to individual stator pole windings. In many of such systems, the polarity of digital pulses determines the direction of rotation of a permanently magnetised rotor element. One serious problem encountered by such systems is that incorrect or spurious pulses are sometimes applied to stator windings with an incorrect or undesirable rotor movement resulting. Thus, in order to prevent such faulty movements, it has been previously known to resort to elaborate and costly logic circuit arrangements to insure that a pulse applied to a stepping motor is of the proper polarity.

SUMMARY OF INVENTION

According to the present invention relative motion producing apparatus includes a magnetised rotor element of predetermined polarity, a plurality of stator poles, each pole energised by a corresponding winding with the magnetised rotor element and stator poles mounted for relative movement therebetween. Means are provided to energize the stator windings with a polar pattern such that an attractive field tends to align the rotor element with a particular stator pole while poles immediately adjacent to the particular pole are energized to produce a repulsive force with respect to the rotor elment, thus tending to align the element with the particular pole. Means for altering the energization of the pole windings are provided whereby the polar pattern is shifted around the stator in steps and as a result of such energization an attractive field is produced by the adjacent pole in the direction of relative movement between the rotor element and stator while the particular pole and other adjacent pole produce repulsive fields tending to move the rotor to the adjacent pole in the direction of relative movement.

Also, according to the present invention, a shift register having a plurality of stages is provided with each stage coupled to a pair of diametrically opposed stator pole windings. Energization of the windings by the shift register output produces a magnetic polar pattern which is shifted unidirectionally in a sequence of steps around the stator and results in relative movement of the rotor element with respect to the stator poles.

Thus, it is an object of the present invention to provide a stepwise driven electric motor in which stator fields are sufficiently strong to proudce a torque capable of rotating a permanently magnetised rotor element.

It is a further object of the invention to provide a stepwise driven electric motor in which an unambiguous control over the direction of the rotor movement in starting from a rest condition is insured.

BRIEF DESCRIPTION OF THE DRAWINGS

One embodiment of the invention will now be described with reference to the drawing in which:
FIG. 1 is a cross-sectional view of a motor,
FIG. 2 shows a laminar member, and
FIG. 3 is a schematic diagram showing a driving circuit.

Referring now to FIG. 1, a motor has a ring of ten equally-spaced pole pieces projecting inwardly from a cylindrical casing shell 2 to form a stator. Each pole piece 1 carries an energising coil 3, and the pole pieces 1 and coils 3 are separated from each other by shields 4, the pole pieces 1, coils 3 and shields 4 being held within the shell 2 by potting compound 5. For purposes of identification the pole pieces 1 and the coils 3 are each individually referenced with a suffix 1–10.

In making the stator, it is preferred to build up the pole pieces by assembling a number of star-shaped laminations 6, each shaped as shown in FIG. 2, with ten parallel-sided limbs 7, into a stack having the required length. After the stack has been formed, coils 3 are assembled, one to each limb 7, and the stack is inserted into the cylindrical shell 2. The shields 4 are then inserted between the coils and the entire assembly is encapsulated in potting compound 5.

After encapsulation the centre of the lamination stack is bored out along the cylindrical axis of the shell 2, the diameter of the bore being such that the centres of the laminations 6 are entirely removed, leaving the pole pieces 1 as shown in FIG. 1.

A shaft 8, mounted in bearings (not shown) in the conventional manner at each end of the shell 2 carries a rotor 9, which is free to rotate within the stator. The rotor has two diametrically opposed members 10 and 11 which are permanently magnetised to form poles of opposite magnetic polarity.

The connections of the coils 3–1 to 3–10 are shown in FIG. 3, and it will be seen that the coils 3 of diametrically disposed poles 1 are connected together, the connections being such that the diametrically opposed poles 1 are always of opposite magnetic polarity. Each coil 3 has a bifilar winding 12 having a centre tap 13, the centre taps 13 of all the windings being connected to earth. The windings 12 are energised by the stages 14 of a five-stage shifting register. Each stage 14 includes a bistable trigger and the windings 12 are energised by output lines 15 and 16 from these triggers, the lines 15 and 16 respectively being connected so that they produce opposite magnetic fields at the pole pieces 1 (FIG. 1). The lines 15 and 16 of a single stage 14 will be seen to be connected respectively in opposite senses to one coil 3 of the set 3–1 to 3–5, and to one coil 3 of the set 3–6 to 3–10.

The stages 14 of the shifting register are interconnected in the conventional manner and are each connected to a shift pulse input line 17 by AND gates 18 so that a shift pulse appearing at line 17 causes the settings of the stages to progress along the shift register from left to right as shown in FIG. 3. The final, or right-hand, stage 14 of the register as shown is connected by a recirculation path consisting of a pair of output lines 19 back to the first, or left-hand, stage 14 and it will be seen that the output lines 19 are connected to the first stage 14 in reversed manner, so that the first stage 14 of the register is set to the opposite state to that of the last stage 14 as the setting from the final stage 14 is re-entered at the first stage 14 of the register.

A preset line 20 is connected to all the stages 14 of the shifting register to forcibly set the triggers of the stages to an initial setting pattern. If the two possible opposite states of a trigger are arbitrarily assigned the values "0" and "1" respectively, then the initial setting pattern produced in the register stages 14 by a pulse applied to the preset line 20 may be referred to as 01100.

For the purpose of describing the operation it will be assumed that the register stages 14 have been set to this pattern, as shown in FIG. 3. Thus, the left-hand stage 14, which is set to the 0 state, produces an output on its line 15; the next two stages 14, set to the 1 state, each produce an output on their respective lines 16; and the final stages 14, which are both set to the 0 state, produce outputs on their associated output lines 15. It will be further assumed that an output from a stage 14 over the line 15 causes the coil 3 of the set 3–1 to 3–5 to which it is connected to produce a north-seeking pole acting on the rotor and the coil 3 of the set 3–6 to 3–10 to produce a south-seeking pole. Thus, the pattern of the poles 1–1 to 1–5 (FIG. 1) produced by the initial setting will be N–S–S–N–N respectively, and the poles 1–6 to 1–10 will be set to a pattern of opposite polarity, S–N–N–S–S respectively. Since the diametrically opposed poles 1 are always of opposite polarity and the members 10 and 11 of the rotor are also of opposite polarity, only the action of the magnetic fields produced by the set of poles 1–1 to 1–5 in relation to the member 10 will be described in detail, the action of the fields produced by the set of poles 1–6 to 1–10 on the member 11 being similar. The member 10 will be assumed to be permanently magnetised to produce a south-seeking magnetic pole. It will be seen therefore, that in response to the initial polar pattern, the rotor is positioned so that the member 10 is positioned opposite the pole 1–1, which is at this time producing an attractive magnetic field with respect to the polarity of the member 10. The two adjacent poles 1–2, 1–3, 1–10 and 1–9 on each side of the pole 1–1 are producing repulsive fields at this time.

After the occurrence of a shifting pulse on the line 17 (FIG. 3) the setting pattern of the first four stages 14 of the shift register will be shifted one place to the right, and the first stage 14 will be set to the opposite state to that which the final stage 14 was set. Thus, the setting pattern of the stages 14 will now be 1–0–1–1–0, and the corresponding polar distribution over the set of poles 1–1 to 1–5 (FIG. 1) will be S N S S N, the set of poles 1–6 to 1–10 being set respectively, N S N N S.

Thus the pole 1–2 will now produce an attractive field with respect to member 10 and the poles 1–1 and 1–3 will produce repulsive fields. Thus the member 10 will move into alignment with the pole 1–2, the motion being promoted both by the attractive field from pole 1–2 and also the repulsive field from the pole 1–1. Thus, the torque available for moving the rotor 9 is produced not only by the attractive force from the pole 1–2 but also by the repulsive force from the pole 1–1, this repulsive force considerably increasing the available torque. At the same time the direction of movement of the rotor is unambiguous, because at the time when the attractive field becomes available at the pole 1–2, the repulsive field is maintained at the pole 1–10.

After the next shifting pulse has been applied to the shifting register from the line 17 (FIG. 3) the entire pattern of polar states will be seen to have moved round the stator by one polar position, and it will also be appreciated that this stepping of the pattern occurs for each subsequent application of a shifting pulse to the shifting register. The member 10 of the rotor is stepped to each of the poles 1–1 to 1–5 in sequence, in five operations, and on the sixth step the polar pattern originally possessed by the poles 1–1 to 1–5 respectively will be possessed by the poles 1–6 to 1–10 respectively. On the eleventh step the original polar pattern of all the poles 1–1 to 1–10 is repeated, so that the rotor 9 will continue to step in the same direction as long as shifting pulses occur on the line 17 (FIG. 3).

Considering the conditions applicable to the member 10 of the rotor 9 (FIG. 1), it will be seen that during any step the member 10 is attracted to a given one of the poles 1–1 to 1–10, and that adjacent poles are producing a repulsive field. When the polar pattern i.e., the magnetic pattern produced by the stator poles, has been advanced by one step through the polar group, the next pole in the succession will now be producing the attractive field while the pole that in the previous step had produced the attractive field will now be producing a repulsive field. At the same time the next preceding pole of the succession will also be producing a repulsive field to make the direction of movement of the member 10 unambiguous.

It will be realised that whereas the shifting register has been described as having only five stages, the operation of the register is such as to produce a polar pattern that is stepped unchanged round the entire group of poles. Thus, it will be appreciated that a ten-stage recirculating shifting register in which each stage is connected to only one pole energising coil could alternatively be used. In this case, of course, the recirculating path from the final to the first stage of the shifting register would not need to incorporate a state-reversing crossover.

Moreover the rotor may be provided with only a single pole piece, similar to the member 10. In this case the polar field distribution pattern need be such as to produce only a single attractive stator pole, all other poles being arranged to produce repulsive fields. Under these circumstances it will be realised that, in order to provide adequate control so that the direction of movement of the rotor is unambiguous any number of poles greater than three may be provided in the stator, although it is preferred to use five or more poles for this purpose. It is also to be understood that it is not necessary that the coils be centre-tapped bifilar wound. Two independent windings, or a single winding used in conjunction with a bidirectional current generator may alternatively be used for the selective production of the appropriate magnetic fields by the poles.

Finally, although the invention has been described as applied to a step-wise driven motor having a stator with a number of poles and a rotor with one or two magnetised members, it will be realised that the roles of stator and rotor may be reversed, and, indeed, that the same driving arrangements may be employed to control the linear movement of magnetised members relative to a set of selectively magnetisable poles.

We claim:

1. Relative motion producing apparatus including a magnetised first member having a pole-piece of first magnetic polarity; a second member; the first and second members mounted for relative movement therebetween; a series of poles on said second member; a plurality of energising windings each electromagnetically coupled to a different one of said poles respectively; and energising means operative initially to energise a first group of the energising windings to produce a pattern of magnetic fields at the first, second, third and fourth adjacent poles of the series of poles, the magnetic field at the third pole being of second polarity opposite to said first polarity and the magnetic fields at the first, second and fourth poles being of said first polarity; said energising means further being operative in response to a shift signal to shift the pattern of magnetic fields along the series of poles by terminating energisation of the first group of windings and energising a second group of the energising windings so that the magnetic field at the fourth pole is of said second polarity and the magnetic fields at the second, third and fifth poles are of said first polarity whereby the pole-piece of the first member initially is attracted into alignment with the third pole and in response to the shift signal is attracted into alignment with the fourth pole to produce relative movement between the first and second members.

2. Apparatus as claimed in claim 1 in which the first member has first and second pole-pieces of first and second magnetic polarity respectively spaced apart in the direction of relative motion and in which the energising means is operative alternatively to energise the windings to produce said pattern of magnetic fields and to produce an inverse pattern of magnetic fields in which the poles have magnetic polarities opposite their magnetic polarities for said pattern to cause the magnetic fields to act on the first and second pole-pieces alternatively.

3. Apparatus as claimed in claim 1 in which the energizing means is operative initially to energise the first group of windings to produce a magnetic field of first polarity at the fifth pole of the series and in response to the shift signal to energise the second group of windings to produce a magnetic field of first polarity at the sixth pole of the series.

4. Apparatus as claimed in claim 3 in which the energising means includes a shift register having a plurality of sequentially connected stages, each winding included in the first and second groups of windings being connected to a different one of the stages, each stage having a first state in which the winding connected thereto is energised to produce a magnetic field of the first polarity and a second state in which the winding connected thereto is energised to produce a magetic field of the second polarity; each stage of the register being set to the state of a preceding stage in response to the shift signal.

5. Apparatus as claimed in claim 2 in which the energising means includes a shift register having a plurality of sequentially connected stages, each winding included in the first and second groups of windings being connected to a different one of the stages, each stage having a first state in which the winding connected thereto is energised to produce a magnetic field of the first polarity and a second state in which the winding connected thereto is energised to produce a magnetic field of the second polarity; the first stage of the register being set to a state opposite to the state of the last stage of the register in response to the shift signal and the remaining stages of the register being set to the same state as the preceding stage in response to the shift signal.

References Cited

UNITED STATES PATENTS

| 3,041,516 | 6/1962 | Bailey | 310—49XV |
|---|---|---|---|
| 3,109,131 | 10/1963 | Byrd | 318—138 |
| 3,124,733 | 3/1964 | Andrews | 318—138 |
| 3,344,325 | 9/1967 | Sklaroff | 318—138 |
| 3,354,367 | 11/1967 | Stockebrand | 318—138 |
| 3,411,059 | 11/1968 | Kaiwa | 318—138 |
| 3,467,902 | 9/1969 | Shimizu et al. | 318—138 |

G. R. SIMMONS, Primary Examiner

U.S. Cl. X.R.

310—49